(No Model.)
T. A. MANAHAN.
FUMIGATOR FOR GRAIN BINS.
No. 457,652. Patented Aug. 11, 1891.
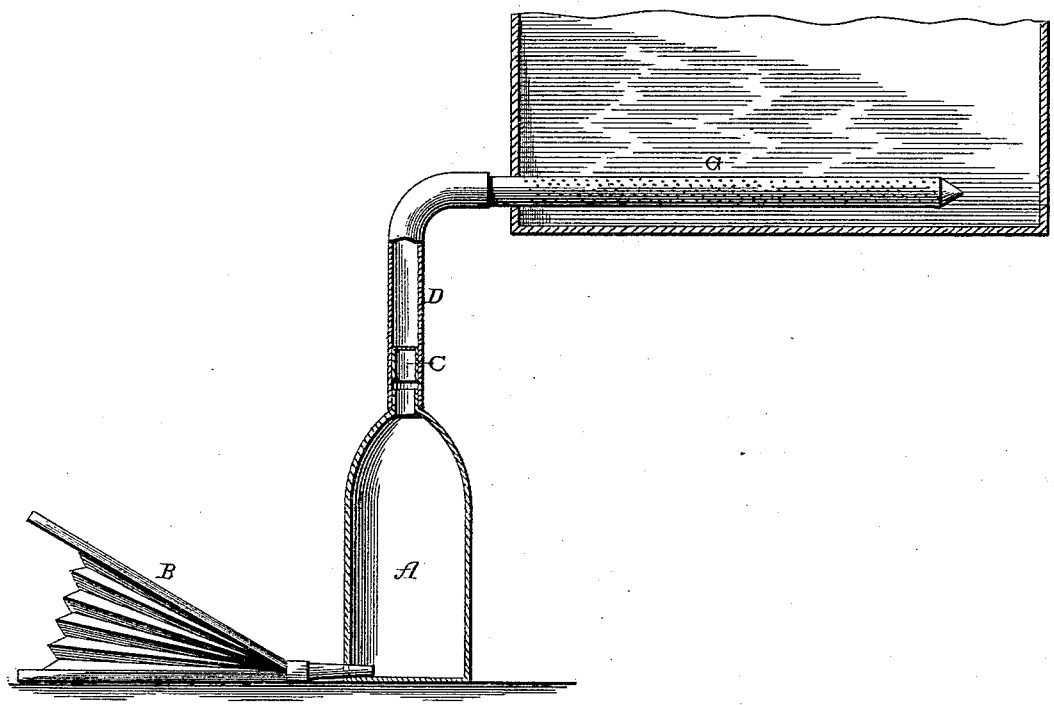
Witnesses:
E. P. Ellis,
J. M. Nesbit
Inventor.
T. A. Manahan,
per Lehmann & Pattison,
Attys.

UNITED STATES PATENT OFFICE.

THADDEUS ATHEBURT MANAHAN, OF YOUNG, TEXAS.

FUMIGATOR FOR GRAIN-BINS.

SPECIFICATION forming part of Letters Patent No. 457,652, dated August 11, 1891.

Application filed March 23, 1891. Serial No. 386,132. (No model.)

*To all whom it may concern:*

Be it known that I, THADDEUS ATHEBURT MANAHAN, of Young, in the county of Freestone and State of Texas, have invented certain new and useful Improvements in Fumigators for Grain-Bins; and I do hereby declare the following to be a full, clear, and exact description of the invention, such as will enable others skilled in the art to which it pertains to make and use it, reference being had to the accompanying drawing, which forms part of this specification.

My invention relates to an improvement in fumigators for grain-bins; and it consists in the combination of a bellows or fan, a funnel in which the sulphur is burned, a spark-arrester placed between the funnel and the conducting-pipe, and a perforated pipe, which is forced into the bottom of the bin, as will be more fully described hereinafter.

The object of my invention is to produce an apparatus by means of which sulphur or other life-destroying fumes can be forced into the bottom of the bin, so as to drive out insects and rats and mice, and thus protect the grain from their depredations.

The accompanying drawing represents a vertical section of an apparatus which embodies my invention.

A represents a funnel or vessel of any desired shape, size, or description, and in which sulphur or any other suitable material is burned for the purpose of producing a smoke, gas, or vapor, which is detrimental to insect or animal life, and connected to this funnel near its lower end is a bellows, fan, or other air-forcing device B, by means of which the gas or vapor is forced from the funnel into the grain-bin. Secured to the top of the funnel is a can C, which is provided with a perforated end, which serves to catch the sparks to prevent them from being forced through the pipe D into the bin. I do not limit myself in regard to the particular form of spark-arrester C that is used, for any form of device which will serve to extinguish the sparks will answer this purpose. Extending from the upper end of the spark-arrester to the outer end of the perforated pipe G, which is inserted into the bottom of the bin, is a conducting-pipe D, which may be made of metal, wood, or any other suitable material. Through one side of the crib, near its bottom, is made an opening, and through this opening the sharp-pointed perforated pipe G is forced. When a fire is made in the funnel A and the bellows B is worked, the vapors or fumes from the sulphur or other substance that is burned are forced through the perforations in the pipe G directly into the bottom of the bin, and this vapor, filling the bin or crib, destroys all insect or animal life, and thus protects the grain in the crib from injury.

Having thus described my invention, I claim—

In a fumigator, the vessel A, provided with a reduced upper portion extended into a pipe, the tube D, adapted to fit over the said extended pipe, a spark-arrester consisting of an inverted can having a perforated bottom secured in said tube, a perforated pipe which extends into the bin and to which the tube D is connected, and a bellows adapted to be inserted into the vessel A, the parts being combined to operate substantially as shown and described.

In testimony whereof I affix my signature in presence of two witnesses.

THADDEUS ATHEBURT MANAHAN.

Witnesses:
  J. C. T. HENDRIX,
  Y. W. MANAHAN.